United States Patent [19]

Kawashima et al.

[11] Patent Number: 4,823,577
[45] Date of Patent: Apr. 25, 1989

[54] METHOD OF FEEDING MATERIAL TO HOT FORGING MACHINE

[75] Inventors: Yoshio Kawashima; Shunji Ogata; Masaaki Yokoyama; Masato Tomiku, all of Kitakyushu; Tsuneo Yamada, Takarazuka; Tsutomu Kuno, Kitakyushu; Hisao Murakami, Yukuhashi; Hiroyuki Morimoto, Kitakyushu; Toyoshige Myojo, Higashimurayama; Kozo Watanabe, Sakado; Toshihiro Tanaka, Niihama, all of Japan

[73] Assignees: Sumimoto Metal Industries, Ltd., Osaka; Sumitomo Heavy Industries, Ltd., Tokyo, both of Japan

[21] Appl. No.: 153,383

[22] Filed: Feb. 8, 1988

Related U.S. Application Data

[62] Division of Ser. No. 835,027, Feb. 28, 1986, Pat. No. 4,761,980.

[30] Foreign Application Priority Data

| Mar. 1, 1985 [JP] | Japan | 60-38903 |
| Oct. 23, 1985 [JP] | Japan | 60-237854 |
| Oct. 23, 1985 [JP] | Japan | 60-237855 |
| Oct. 23, 1985 [JP] | Japan | 60-163439[U] |
| Oct. 31, 1985 [JP] | Japan | 60-242859 |

[51] Int. Cl.$^4$ .............................. B21J 7/46; B21J 1/06
[52] U.S. Cl. .......................................... 72/24; 72/342; 72/339; 72/336; 72/421; 72/361
[58] Field of Search ............ 72/24, 342, 421, 361, 72/336, 339; 10/27 H, 25; 140/139, 140; 83/111, 15, 170, 18, 175, 365

[56] References Cited

U.S. PATENT DOCUMENTS

| 1,341,626 | 5/1920 | Kobert | 10/27 H |
| 2,276,521 | 3/1942 | Stark | 10/27 H |
| 2,665,654 | 1/1954 | Lyon | 72/24 |
| 2,702,937 | 3/1955 | Smart | 83/175 |
| 2,953,794 | 9/1960 | Klooz | 10/27 H |
| 3,424,208 | 1/1969 | Heisler | 140/140 |
| 3,673,905 | 7/1972 | Kono | 83/175 |
| 3,817,067 | 6/1974 | Voorehes et al. | 72/24 |
| 3,820,367 | 6/1974 | Kline | 72/17 |
| 4,559,854 | 12/1985 | Jurgens | 83/170 |
| 4,627,253 | 12/1986 | Tennessen et al. | 72/405 |

FOREIGN PATENT DOCUMENTS

| 0072476 | 7/1982 | European Pat. Off. . | |
| 263502 | 7/1968 | Fed. Rep. of Germany . | |
| 2335018 | 1/1974 | Fed. Rep. of Germany . | |
| 2745291 | 4/1978 | Fed. Rep. of Germany . | |
| 2746161 | 4/1979 | Fed. Rep. of Germany | 72/421 |
| 38632 | 3/1983 | Japan . | |
| 27051 | 6/1983 | Japan . | |

*Primary Examiner*—Daniel C. Crane
*Attorney, Agent, or Firm*—Armstrong, Nikaido, Marmelstein & Kubovcik

[57] ABSTRACT

Disclosed is a method and apparatus for feeding a material to a hot forging machine in a forging line in which a coiled material is uncoiled, straightened, fed intermittently by pinch rollers through a heating device, cut by a cutting device and then fed into a hot forging machine. The method has the steps of preparing a driving device which drives the pinch rollers mechanically independently from the hot forging machine; picking up the timing of forging conducted by the hot forging machine as an electric signal, and controlling the driving device in accordance with the electric signal.

2 Claims, 10 Drawing Sheets

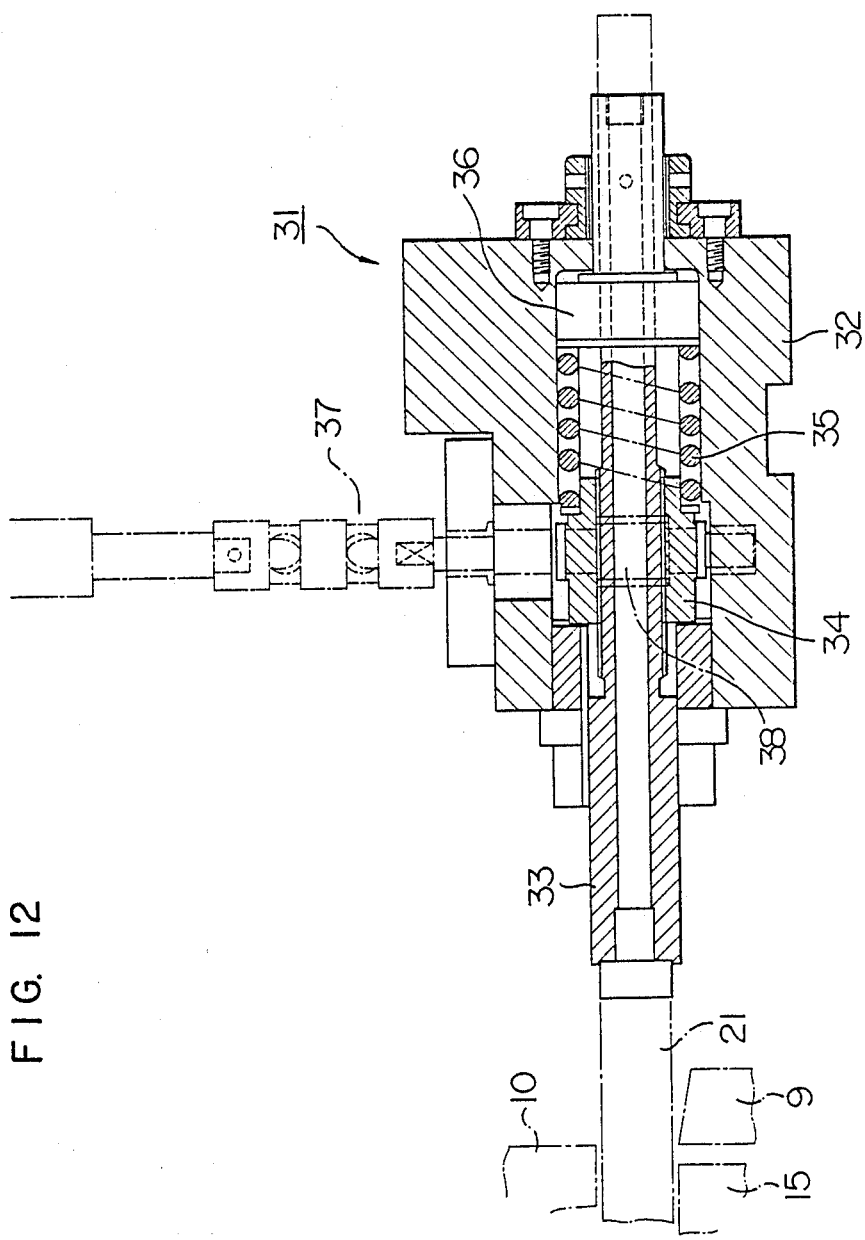

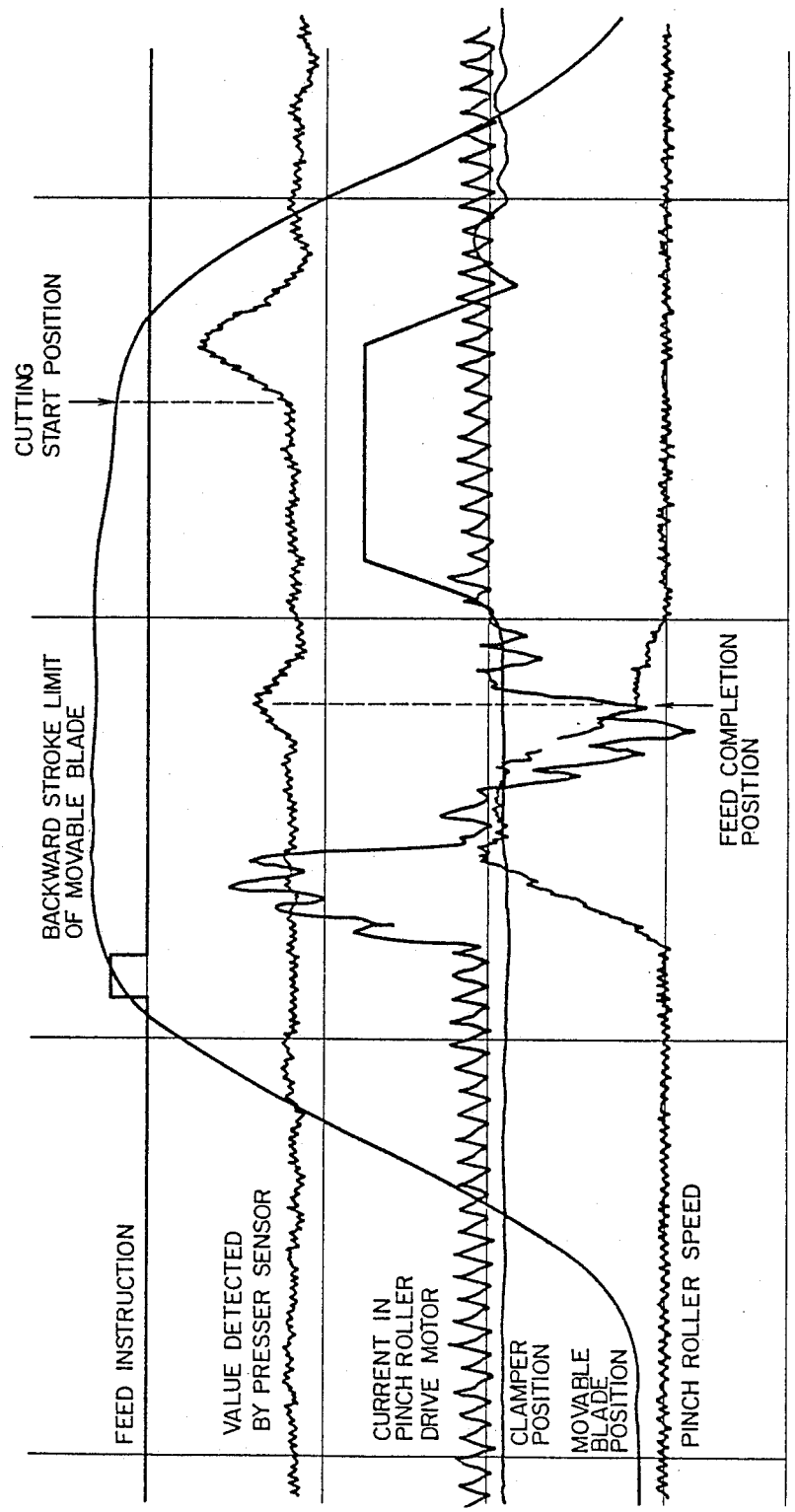

METHOD OF FEEDING MATERIAL TO HOT FORGING MACHINE

This is a division of application Ser. No. 835,027 filed Feb. 28, 1986, now U.S. Pat. No. 4,761,980, issued Aug. 9, 1988.

BACKGROUND OF THE INVENTION

1. Field of the Invention:

The present invention relates to a method of feeding a material to a hot forging machine and, more particularly, to a method of uncoiling a coiled material, straightening the uncoiled material, heating the straightened material, cutting the heated material and then feeding the cut material into a hot forging machine.

2. Description of the Prior Art:

Hitherto, the production of nuts or similar products from a wire or strip employs the steps of heating an elongated straight rod material in a heating furnace, intermittently extracting the heated elongated rod material from the heating furnace, cutting the extracted elongated rod material into pieces from the leading end of the material, and then forging the pieces of the material into the final shape and size. In this method, since the blank material is an elongated straight rod material there is a practical limit in the length of the material. Usually, therefore, elongated rod materials are jointed successively, so that a considerably long portions around the joint portions have to be uneconomically wasted. To obviate this problem, an apparatus has been proposed which is to uncoil a material which has been coiled as in the case of cold forging, straightening the uncoiled material, heating the straightened material and then feeding the heated material into the hot forging machine.

A typical example of such an apparatus includes a pair of cams fixed to a shaft drivingly connected to a main driving crankshaft of a hot forging machine. One of these cams is adapted to cause, through a connecting link and lever mechanism and a transmission rod, a reciprocatory rotary motion of a feed roller which is disposed on the inlet side of the heating device, while the other cam is adapted to upwardly shift an upper guide roller and the material during the backward rotation of the feed roller. In the forward rotation of the feed roller, the upper guide roller is lowered into cooperation with the feed roller, thereby intermittently feeding the material into the forging press. This apparatus is shown in Japanese Patent Unexamined Publication No. 38632/83.

This type of apparatus, however, cannot be used suitably for materials having large diameters, although it is practically usable for materials of comparatively small diameters. Namely, when the material has a large diameter, it is necessary to employ a straightening device having a multiplicity of stages. The driving power for driving the feed roll also has to be large, theoretically requiring an impractically huge lever and link mechanism. It is impossible to connect the lever and link mechanism to the conventional hot forging machine which is designed to handle the material in the form of an elongated straight rod, because such a hot forging machine is not designed to provide the shaft drivingly connected to the main crankshaft. In addition, there is a risk that the straightened material is undesirably bent when it is shifted upward during backward rotation of the feed roll.

Furthermore, the precision of operation is naturally limited due to the use of the cams, links and levers, and the use of a stopper for ensuring the precision is indispensable. Thus, the above-described known apparatus necessitates adjustment of the stopper and links for the purpose of control of the length at which the material is cut, and suffers from an inferior response characteristics.

SUMMARY OF THE INVENTION

Accordingly, an object of the invention is to provide a method of feeding a material to a hot forging machine, capable of feeding materials of considerably large diameters, thereby overcoming the abovedescribed problems of the prior art.

To this end, according to an aspect of the invention, there is provided, in a forging line in which a coiled material is uncoiled, straightened, fed intermittently by pinch rollers through a heating device, cut by a cutting device and then fed into a hot forging machine; a method of feeding the material to the hot forging machine comprising: preparing a driving device which drives the pinch rollers mechanically independently from the hot forging machine; picking up the timing of forging conducted by the hot forging machine as an electric signal; and controlling the driving device in accordance with the electric signal.

According to another aspect of the invention, there is provided, in a forging line having a series of arrangement including a strip material uncoiling device for uncoiling a coiled strip or wire material, a straightening device for straightening the uncoiled material, pinch rollers for feeding the material, a heating device for heating the material, a cutting device for cutting the material into blanks, and a hot forging machine, so that the material is fed intermittently by the pinch rollers and cut into blanks in a predetermined length and the cut blanks are fed into the hot forging machine; an apparatus for feeding the material to the hot forging machine comprising: a driving device for driving the pinch rollers mechanically independently of the hot forging machine; a signal generating device for generating an electric signal synchronous with the timing of forging conducted by the hot forging machine; and a controller for controlling the operation of the driving device in accordance with the electric signal.

However, it has been proved through an experiment that the material feeding method of the invention explained above suffers from the following problems when used in hot forging of a medium size material of a diameter of, for example, around 19 mm$\phi$.

Namely, when such a medium size material is fed to a hot forging machine, it takes a considerably long time (about 0.213 second) for the cutting blade to be retracted after the cut material is fed to the next station following the cutting, although the cutting itself is completed in a short time of about 0.037 second. Meanwhile, the material is thermally expanded by, for example, about 0.23 mm during the retraction of the cutting blade.

Since the material is restrained by the feed roll and the movable blade on both sides of the heating device, the material is progressively bent and, as a result of accumulation of the bend, the heating device is damaged. To obviate this problem, it is necessary to suspend the operation for the purpose of elimination of the bend, after running over a predetermined time.

According to an embodiment of the invention, the feed roll is operated in such a manner that the succeeding material after the cutting is fed backward at least by an amount corresponding to the amount of thermal expansion and, during the forward feeding of the material, the material is fed by an amount which is the sum of the requiring cutting length and the difference between the amount of the backward feed and the amount of thermal expansion. In consequence, the undesirable bending of the material due to thermal expansion between the movable blade and the feed roll is eliminated, thus allowing a continuous operation for a long period.

It has been also proved through experiments that the material feeding method and apparatus of the invention encounter the following problem, when it is used for the feed of a large-size material of a diameter of, for example, 50 mm$\phi$ to a hot forging machine.

Namely, it takes a considerably long time (about 0.08 second) for the material of a large diameter to be cut before the feed to the hot forging machine, so that the material is thermally expanded by, for example, 0.17 mm during the cutting. This thermal expansion produces the following problems: namely; (1) damaging of the movable blade due to lateral load applied thereto; (2) oblique cutting of the material due to a large thrust force produced by the thermal expansion, resulting in an incomplete cutting which leaves a fin or burr, resulting in laps or seams on the product; and (3) since the material is restrained by the feed roll and the movable blade on both sides of the heating device, the materials progressively bent and the heating device is damaged by the accumulated bend. In order to remove the bend caused by the thermal expansion, it is necessary to suspend the operation after operation for a predetermined time.

In order to obviate this problem, according to another embodiment of the invention, the feed roll is rotated backward such that, during the cutting of the material, as well as in the period from the moment immediately after the cutting till the completion of retraction of the movable blade, the leading end surface of the succeeding material is maintained at the same position as the position at which the cutting was commenced, without being extended in the feeding direction by thermal expansion. With this arrangement, the undesirable interference between the cut material and the movable blade is eliminated, thus ensuring a smooth movement of the cutting blade.

It has been proved through experiments also that the following problem is encountered by the material feeding method and apparatus of the invention stated before.

Rotation amount or angle of rotation of the pinch rollers for feeding the material can be controlled precisely and in a desired manner through, for example, numerical control method. However, there is no means for detecting the amount of feed when the pinch rollers 3 have been worn down, nor the means is provided for the compensation for any change in the feed amount caused by the wear of the pinch rollers. The trailing end portion of the material cannot be fed by the pinch rollers but can be fed by the feed rollers provided in the hot forging machine. The precise control of the rotation angle of the feed roll, however, is impossible, unlike the pinch rollers. In order to cut the trailing end portion of the material precisely in the desired length, therefore, it is necessary to provide a stopper at a position corresponding to the cutting length, and to allow a slip of the feed roll when the material is stopped by the stopper, thereby assuring the constant cutting length of the material. This method relying upon the stopper, however, cannot precisely set the cutting length, so that the product after the cutting tends to be adversely affected by unavoidable irregularity in the cutting length.

In order to obviate this problem, according to a further embodiment of the invention, the material feeding apparatus incorporates a stopper device for receiving the fed material, the stopper device being provided with a pressure sensor and a forward and backward shifting mechanism. With this arrangement, it is possible to observe the cutting length, once the desired cutting length is set before the start of the cutting.

The forging line to which the invention is applied incorporates pinch rollers for feeding the material, a heating means, a feed roll for feeding the material, a cutting device and a hot forging machine. In operation, the feed of the material is conducted by the pinch rollers while the cutting device is in the retracted position, and is completed before the cutting is commenced. Then, the material is cut and the cut blank is fed into the forging position. Thereafter, the cutting device is reset to the retracted position. This operation is conducted cyclically and repeatedly. When the leading coiled material has been consumed and the new coiled material is fed, it is desired that the material is cut correctly and smoothly at the joint portion between these two coils.

According to a preferred embodiment of the invention, the material to be forged is fed smoothly and precisely by an amount corresponding to the size of the blank, in accordance with the following steps:

Namely, there is provided, a method wherein before the trailing end of the preceding material passes the pinch rollers, the feed rollers are made to take part in the feeding of the preceding material and, after the trailing end has left the pinch rollers, the preceding material is fed solely by the feed rollers, while the pinch rollers feed the subsequent material, the method comprising: before the trailing end of the preceding material comes into the region of at least one cutting length from the center or the pinch line of the feed rollers, setting the gap between the trailing end of the preceding material and the leading end of the subsequent material to a value within one cutting length; feeding the subsequent material by the pinch rollers at a mean speed of $N \times (l_f - \Delta l)$, where N represents the number of feed strokes per minute of the preceding material, $l_f$ represents the length of the preceding material corresponding to one cutting length and $\Delta l$ represents the amount of thermal expansion per one cutting length; detecting the trailing end of the preceding material at a suitable place and storing in a memory and tracing the position of the trailing end downstream from the position of detection; and after the traced position of the trailing end of the preceding material has come into the region of a distance of No ($=2$) cutting lengths from the center of the feed rollers, disposing of the blanks cut in subsequent ($N_o + N_1$) strokes, where condition of $N_o + N_1 \geq 4$ is met, the blanks disposed of being scrapped without being fed to the hot forging machine; after the trailing end of the preceding material has come into the region of a distance of Mo ($=2$) cutting lengths from the cutting plane, disposing of the blanks cut in the subsequent $M_o + M_1$ strokes, where the condition of $M_o + M_1 \geq 3$ is met, the blanks disposed of being scrapped without being fed to the hot forging machine.

These and other objects, features and advantages of the invention will become more apparent from the following description of the preferred embodiments when the same is read in conjunction with the accompanying drawings.

BRIEF DESCRIPTION OF THE DRAWINGS

FIG. 12 is a sectional view of an improved stopper device used in the invention;

FIG. 13 is a diagram showing the condition for setting the stopping position for stopping the material by the stopper device shown in FIG. 12;

DESCRIPTION OF THE PREFERRED EMBODIMENTS

Figure 1:
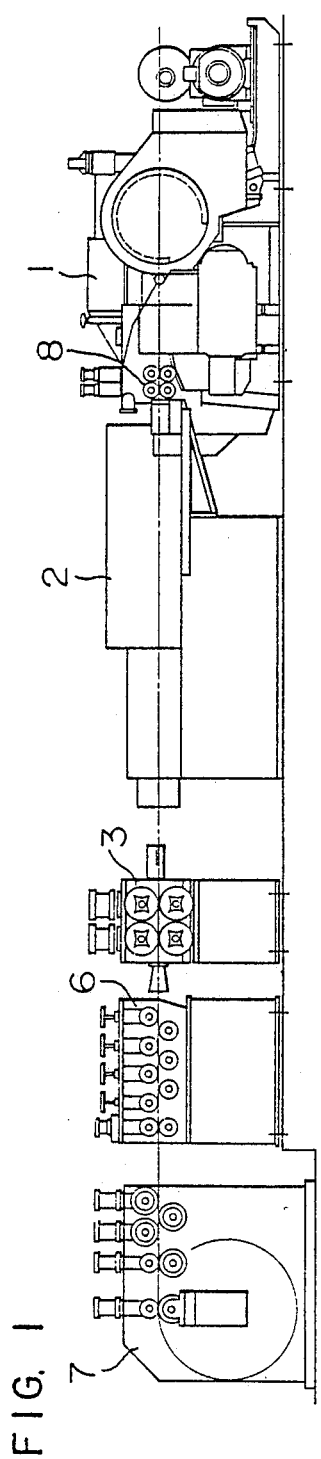
FIG. 1 is a schematic side elevational view of an apparatus in accordance with the invention.
Figure 2:
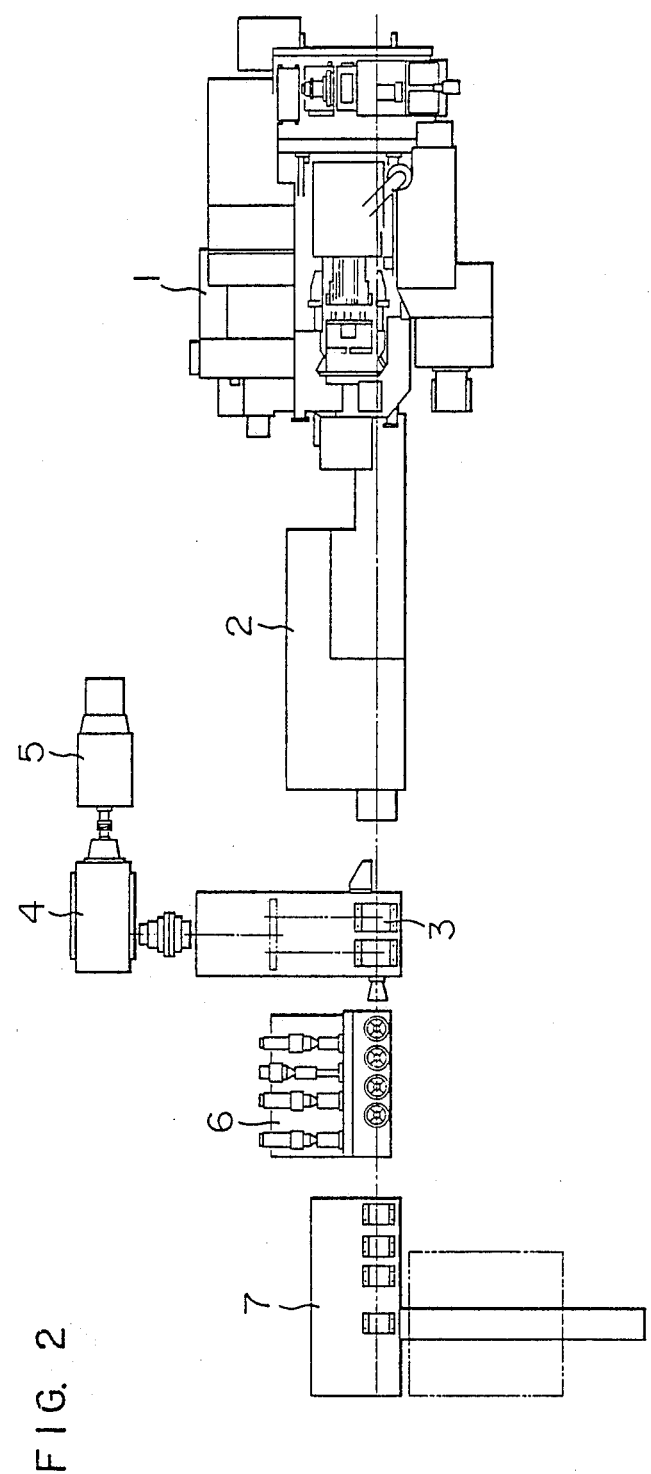
FIG. 2 is a schematic plan view of the apparatus shown in FIG. 2.

FIGS. 1 and 2 are a schematic side elevational view and a schematic plan view of an apparatus in accordance with the invention. In these Figures, a reference numeral 1 denotes a hot forging machine, 2 denotes a strip heating device such as of high-frequency wave type, 3 denotes strip extracting and feeding pinch rollers, 4 denotes a reduction gear and 5 denotes a motor which drives the pinch rollers 3 through the reduction gear 4. A reference numeral 6 designates a straightening device which straightens the coiled strip to an extent necessary for the material to pass through the heating device 2. The straightening device 6 includes a vertical straightening mechanism and a horizontal straightening mechanism. A reference numeral 7 designates an uncoiling device, including an uncoiling and coiling drive mechanism, as well as a simple straightening mechanism. Feed rollers 8 for feeding the strip and a cutting device are disposed at the inlet side of the hot forging machine 1.

Figure 3:
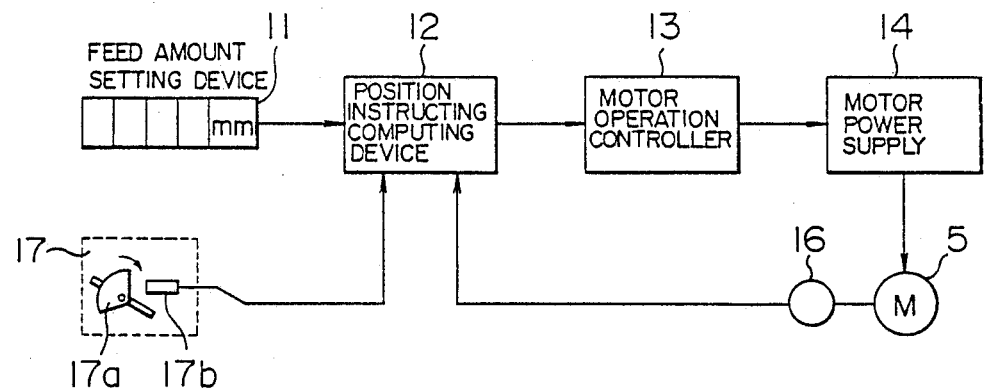
FIG. 3 is a block diagram of a drive controlling mechanism of an embodiment which employs an electric motor as the power source for driving the rollers.

The electric control system for the material feeding apparatus of the invention will be explained hereinunder. The control blocks for controlling the operation of the material feeding apparatus is shown in FIG. 3. The control system includes a feed amount setting device 11, a position instructing computing device 12, a motor controller 13 for the motor 5 which drives the pinch rollers, a power supply 14 for the motor, a pulse generator (P.G) 16 for detecting the amount of rotation of the motor 5, and a detector 17 for detecting the rotational position of the forging machine.

In operation of the embodiment described hereinbefore, the timing for feeding the feed of the material is determined by a synchronizing signal transmitted from the forging machine rotational position detector 17. Only a part of one full rotation of the forging machine, e.g., 100° in 360° rotation, is available for the feed of the material. The forging machine rotational position detector 17 is composed of, for example, a sector-shaped iron core 17a provided for rotation in unison with the main shaft of the forging machine, and a magnetic proximity switch 17b disposed in the vicinity of the iron core 17a. A synchronizing signal indicative of the allowance for the feed of the material is produced when the iron core 17a is detected by the proximity switch 17b.

The pinch roller driving motor 5 starts to operate in response to the synchronizing signal and stops after feeding the strip by an amount appointed by the feed amount setting device 11.

Figure 4:
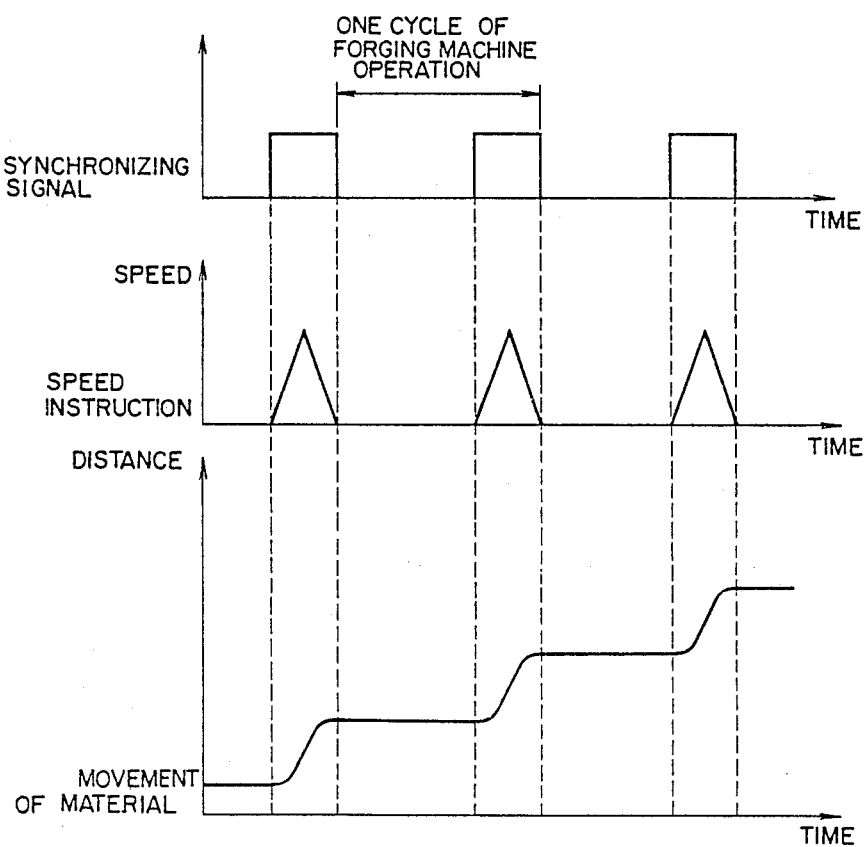
FIG. 4 is a diagram showing the relationship between a synchronizing signal, speed instruction and the material movement.

The position instructing computing device 12 operates in accordance with the synchronizing signal from the forging machine rotational position detector 17 and compares the rotation amount outputted from a pulse generator (P.G) 16 which detects the rotation amount of the motor 5 with the feeding amount delivered by the feeding amount setting device 11, thereby producing a speed signal. In accordance with this speed control signal, the motor control section 13 delivers to the motor power supply 14 a speed instruction of a waveform suitable for the control of the motor 5. In accordance with this speed instruction, speed control of the D.C. motor is conducted by Ward-Leonard method or by field current control method. The relationships between the synchronizing signal, speed instruction and the material movement are shown in FIG. 4.

Figure 5:
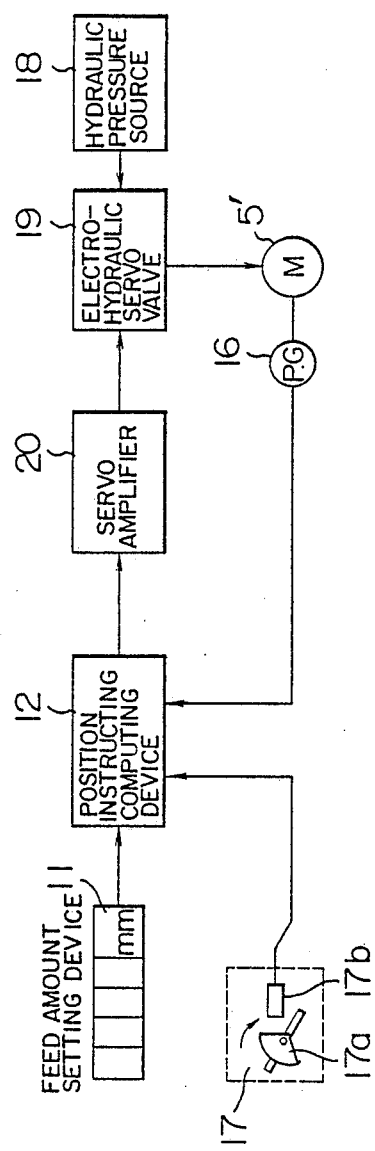
FIG. 5 is a block diagram of a drive controlling mechanism of an embodiment which employs a hydraulic motor as the power source for driving the rollers.

FIG. 5 shows a modification in which a hydraulic motor 5' is used in place of the motor 5.

This control system is constituted by the following parts: a feed amount setting device 11, a position instructing computing device 12, a servo amplifier 20 for the pinch roll servomotor 5', a hydraulic power supply 18, an electro-hydraulic servo valve 19, a pulse generator (P.G) 16 for detecting the amount of rotation of the hydraulic motor 5', and a forging machine rotational position detector 17.

In the embodiment shown in FIG. 5, the pinch roll hydraulic motor 5' starts to operate in response to the synchronizing signal, and the operation of the hydraulic motor 5' is stopped after a feed by an amount appointed by the feed amount setting device 11. The position instructing computing device 12 operates in accordance with the synchronizing signal from the forging machine rotational position setting device 17, and compares the rotation amount output from the pulse generator (P.G) which detects the rotation amount of the hydraulic motor 5' with the feed amount instruction from the feed amount setting device 11, thereby producing a speed control signal. In accordance with the speed control signal, the servo amplifier 13 delivers to the electrohydraulic servo valve 14 a speed instruction of a waveform suitable for the control of the hydraulic motor 5'. Then, the speed control of the hydraulic motor such as a geared type one is conducted by a direct driving type hydraulic servo valve.

According to this arrangement, it is possible to attain a feed precision equivalent to or higher than that produced by a stopper device having a mechanical control means, by an additional provision of a simple electric instrumentation, thereby eliminating the risk of troubles such as burrs in the forging due to reactional force produced in the material after the stopping by the stopper, or scratching of the material by the rollers immediately upstream of the hot forging machine. The pinch rollers also contribute to the uncoiling and straightening of the material, even when the material has a comparatively large diameter of about 50 mm with which the invention is primarily concerned, so that the necessity for huge link and lever mechanism can be eliminated.

Materials of comparatively small diameters, e.g., about 25 mm, with which the conventional forging lines are mainly concerned, can be processed equally well by the forging line incorporating the feeding apparatus of the invention. This can be achieved simply by reducing the driving power of the pinch rollers from, for example, 110 Kw down to 70 Kw, while lifting or lowering unnecessary straightening rollers away from the path of material. This suggests that the method of the invention can be adapted for a variety of material size, through a control by a computer which computes and sets optimum amount of feed and number of stages of the straightening device for the variety of material.

It is to be understood also that the use of the proximity switch as described eliminates the necessity for additional mechanical transmission means, so that the material feeding apparatus of the invention can easily be incorporated in existing forging lines, offering a great advantage form the view point of economy.

Figure 6:
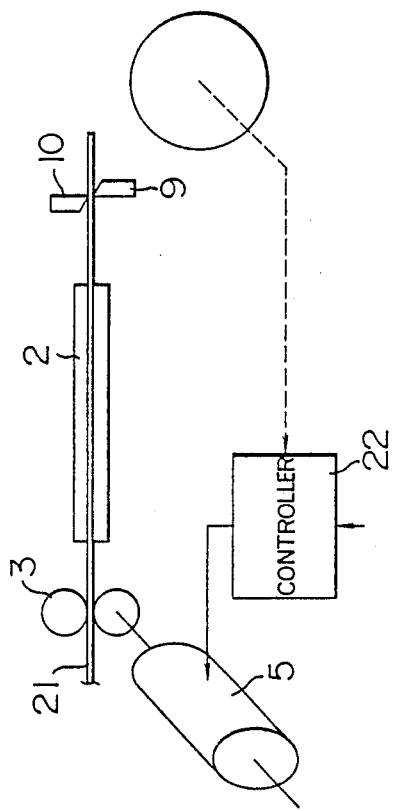
FIG. 6 is an illustration of a control method for preventing bending of material due to thermal expansion.
Figure 7A:
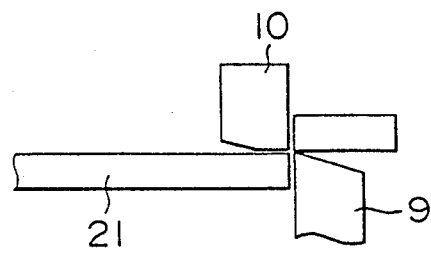
FIGS. 7a and 7b are illustrations of the manners in which the material is cut when fed by the conventional method.
Figure 7B:
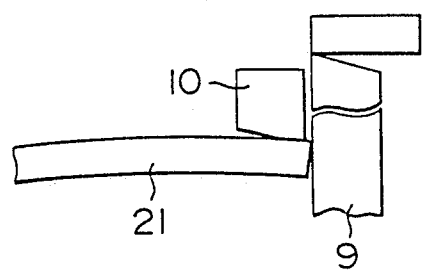
Figure 8:
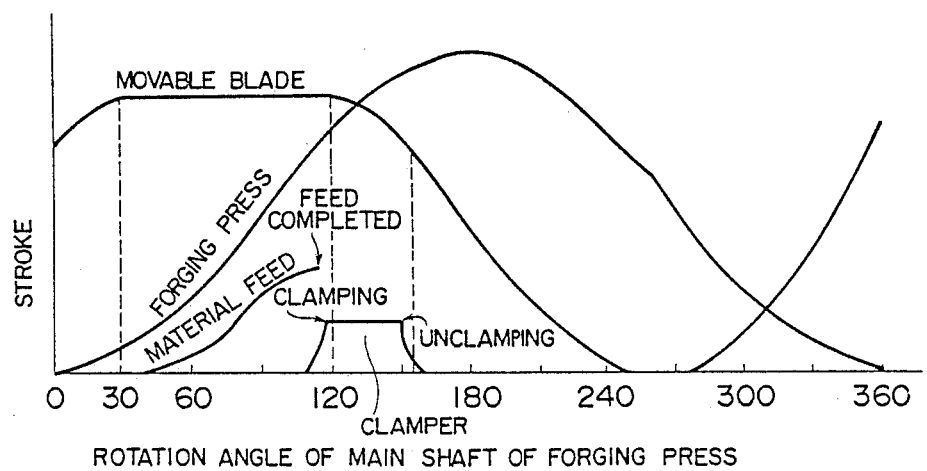
FIG. 8 is a diagram showing a forging cycle.
Figure 9A:
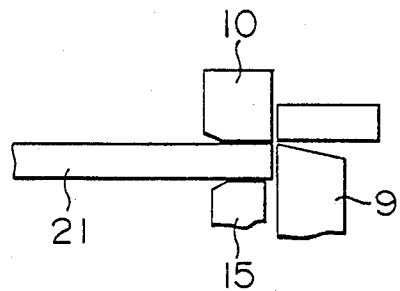
FIGS. 9a and 9b are illustrations of the material feeding method in accordance with the invention, showing particularly the state in which the cutting of the material has been completed and the state in which the material has been fed backward after cutting, respectively.
Figure 9B:
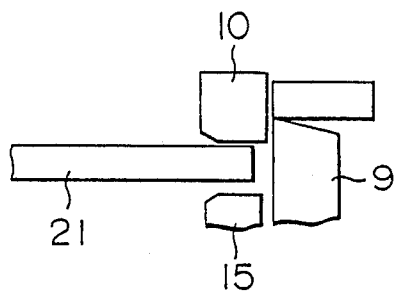

The material feeding apparatus in accordance with the invention encounters various problems which are attributable to the thermal expansion encountered during the passage of the strip through the heating device 2. The degree of influence of the thermal expansion, however, somewhat differs according to the material size. In the case of a medium size material of a diameter of, for example, 19 mm, a considerably long time of about 0.213 second is required for the movable blade 9 to be completely retracted after the cut material is shifted to the forging station so that a considerably large thermal expansion on the order of about 0.23 mm is caused during the retraction of the movable blade, although the thermal expansion during the cutting is not so large due to the fact that the cutting itself is completed in a very short time of, for example, about 0.037 second. Referring to FIGS. 6 to 9, since the material 21 is fixed and restrained by the pinch rollers 3 and the movable blade 9 on both sides of the heating device 2 as shown in FIG. 6, the material is gradually bent as shown in FIG. 7. When this bend is accumulated, a large force is produced to cause a damage of the heating device 2. FIG. 8 is a diagram showing the forging cycle of a hot forging system by which this problem is encountered.

In FIG. 8, the axis of abscissa represents the rotation angle of the spindle or main shaft of a forging press in the hot forging system 1, while the axis of ordinate indicates the strokes of the forging press, movable blade, material and the clamper.

The angle 0° on the axis of abscissa corresponds to the forward stroke limit of the forging press. The forging press is progressively retracted in the region between 0° and 180° and reaches the backward stroke end when the angle has reached 180°. Then, in the region between 180° and 360°, the forging press is driven forwardly and reaches the forward stroke end at the angle of 360°. This reciprocating motion is continued consecutively. On the other hand, the material is fed intermittently by the pinch rollers 3. Namely, the feed is commenced at angle of 30° and the feed is completed at the angle of 105°. The clamper 15 is operated so as to clamp the material immediately after the completion of feed of the material. Meanwhile, the movable blade 9 is progressively retracted and reaches its backward stroke end when the angle is 30°. The blade 9 is held at this position until the angle is increased to 110°. Then, the blade is advanced again after the angle has exceeded 110° and completes the cutting when the angle is 160°. The movable blade further moves forwardly to the forward stroke limit and, after being held in this position, commences its backward stroke again.

According to the material feeding method of the invention, the material 21 is fed to the hot forging system 1 by means of the pinch rollers 3, in a manner which will be explained hereinunder.

Data concerning factors necessary for the control of the feed is beforehand stored in a controller 22. These factors are: the kind of material 21 to be fed; heating temperature in the heating device 2; and the elongation of the material due to thermal expansion caused during the period required for the movable blade 9 to be retracted to the position where it does not interfere with the leading end surface of the succeeding material after the completion of the cutting. The main shaft of the forging press is electrically connected to the controller 22, such that the signal representing the completion of the cutting of the material is taken out from, for example, the rotation angle of the main shaft of the forging press and delivered to the controller 22. The controller 22 then produces, in accordance with the signal from the main shaft and the previously set value of the thermal expansion, a signal for driving the drive motor 5 for the pinch rollers 3, so as to reverse the pinch rollers 3 in such a manner that the leading end surface of the succeeding material is fed back by an amount greater than the amount of the thermal expansion.

Then, the signal for feeding the succeeding material 21 is derived from the rotation angle of the main shaft of the forging press and this signal is fed to the controller 22, and the feed rollers are driven forwardly in such a manner as to feed the material 21 by an amount which is the sum of the required cutting length and the difference between the amount of the backward feed and the amount of the thermal expansion. In the drawings, a reference numeral 10 denotes a stationary blade which cooperates with the movable blade 9 in cutting the material 21.

(Result of Experiment)

A strip of a material specified by S45C and having an outside diameter of 19 mmφ was heated to 1200° C. by the heating device and was fed to the hot forging machine at a feeding stroke of 30 mm and a feeding cycle of 180 strokes per minute. The time required for the movable blade to be retracted to a position where it does not interfere with the leading surface of the succeeding material after the completion of the cutting was 0.213 second, while the elongation experienced during this period was 0.23 mm. In the experiment, therefore, the pinch rollers (0.037 mmφ in outside diameter) were reversed for 0.037 second at a speed of 1.72 r.p.m. after the completion of the cutting, and were then driven forwardly so as to feed the leading end surface of the succeeding material immediately after the completion of retraction of the movable blade, by an amount of 30.77 mm as the sum of the required cutting length (30 mm) and the difference (0.77 mm) between the amount of backward feed and the amount of thermal expansion. In consequence, the material could be cut in good order successively, without suffering any bending of the material.

Figure 10:
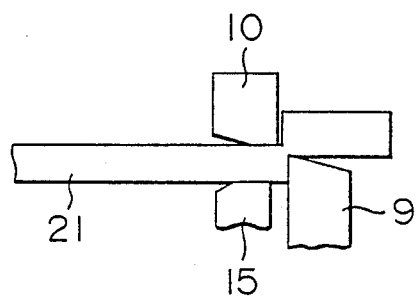
FIG. 10 is an illustration of a material having a large diameter, which has been cut in accordance with a conventional material feeding method.
Figure 11A:
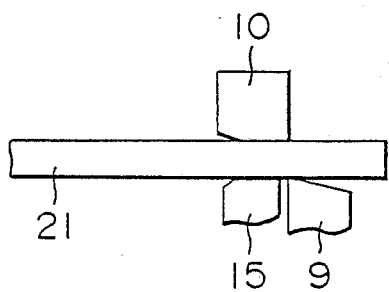
FIGS. 11a and 11b are illustrations of a method in accordance with the invention for feeding a material of a large diameter, showing particularly the state in which the feed of the material has been completed and the state in which the material is being cut, respectively.
Figure 11B:
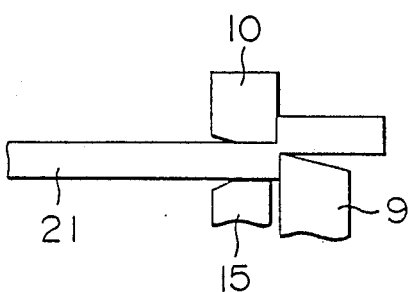

On the other hand, the cutting of a comparatively large diameter of about 50 mm requires a considerably long time of about 0.08 second for the cutting, so that the thermal expansion during the cutting is not negligible. The amount of thermal expansion during the cutting is about 0.17 mm. In consequence, lateral load is applied to the movable blade 9 as shown in FIG. 10, causing various troubles such as damaging of the cutting edge or an oblique incomplete cutting of the material in such a manner as to leave a burr. In addition, the bending of the material due to thermal expansion progressively proceeds to cause a breakdown of the heating device as in the case of the medium-size material.

The forging cycle is materially the same as that for the medium-size material explained in connection with FIG. 8, except that the feed of the material is completed at angle of 110° and, while the movable blade 8 which reaches the backward stroke end when the angle is 30° commences its forward stroke when the angle is 120° so as to complete the cutting when the angle is 180°.

The following control is conducted in the feed of the large-size material 21 by the pinch rollers 3 to the hot forging system 1 which employs the abovedescribed forging cycle.

Data concerning the factors for conducting the control of the feed of the material is beforehand stored in a controller 22 (see FIG. 6). These factors are, for example: the kind of the material 21; heating temperature in the heating device 2; and the time length required for the cutting and the time length from the moment immediately after the completion of cutting till the moment at which the retraction of the movable blade 9 is completed, as well as the amounts of thermal expansion experienced during such time lengths.

The main shaft of the forging press is electrically connected to the controller 22, such that the signals representing the completion of feed of the material 21, as well as the commencement of the retraction of the movable blade 6, are derived from the rotation angle of the main shaft of the forging press and delivered to the controller 22.

The controller 22 produces, in accordance with the signals derived from the main shaft of the forging press and the data such as the time lengths and the thermal expansion amount mentioned above, a signal for reversing the drive motor 5 for the pinch rollers 3, in such a manner that the leading end surface of the succeeding material is held at the position where the cutting is commenced, during cutting and during the period from the moment immediately after the completion of cutting and the moment at which the retraction of the movable blade 9 is completed.

(Result of Experiment)

A strip of a material specified by S45C and having an outside diameter of 50 mmφ was heated to 1200° C. in the heating device, and was fed to the hot forging press at a feed stroke of 100 mm and a feed frequency of 100 strokes per minute. The time length required for the cutting of the material was 0.08 second, while the time length required for the movable blade to be completely retracted after the completion of cutting was 0.37 second. Meanwhile, the material exhibited an expansion of 0.9 mm during these time lengths. The pinch rollers (outside diameter of 300 mm), therefore, were controlled to rotate backwardly at a speed of 0.127 r.p.m so that good cutting surfaces were obtained successively and no bending of the material was observed.

According to the invention, the rotation amount or angle of rotation of the pinch rollers for feeding the material can be controlled precisely and in a desired manner through, for example, numerical control method. However, there is no means for detecting the amount of feed when the pinch rollers 3 have been worn down, nor the means is provided for the compensation for any change in the feed amount caused by the wear of the pinch rollers 3. The trailing end portion of the material cannot be fed by the pinch rollers but can be fed by the feed rollers 8 provided in the hot forging machine. The precise control of the rotation angle of the feed rollers 8, however, is impossible, unlike the pinch rollers 3. In order to cut the trailing end portion of the material precisely in the desired length, therefore, it is necessary to provide a stopper at a position corresponding to the cutting length, and to allow a slip of the feed rollers 8 when the material is stopped by the stopper, thereby assuring the constant cutting length of the material. This method relying upon the stopper, however, cannot precisely set the cutting length, so that the product after the cutting tends to be adversely affected by unavoidable irregularity in the cutting length.

In view of the above, the following embodiment intends to make it possible to cut the material precisely in the desired length, even when the pinch rollers have been worn down or even when the trailing end of the coiled material is being processed.

FIG. 12 is a sectional view of a stopper device 31 which is incorporated in a hot forging machine to which the invention pertains. The stopper device 31 has a cylinder block 32, a material receiving member 33 placed in the cylinder block 32 and adapted to receive the material 21, and a pressure sensor 36 such as a load cell which is disposed in the cylinder block 32 such as to fit around the material receiving member 33 and adapted to detect the impact of collision of the material 21 with the material receiving member 33 through a flange member 34 screwed to the material supporting member 33 and a spring 35. A mechanism 37 is provided for adjustment of the position of the material receiving member 33, so as to allow the setting of the length of cutting of the material 21. In this embodiment, the mechanism 37 includes worm teeth formed on the outer peripheral surface of the flange member 34 and a worm 38 meshing with the worm teeth, so as to cause the material receiving member to move back and forth.

An explanation will be made hereinunder as to the method of setting the position of the stopper device 31, for cutting the material 21 in a predetermined length before the material is supplied to the hot forging machine.

FIG. 13 is a diagram showing the factors used when the material 21 is intermittently fed to the hot forging machine 1 by means of the material feeding apparatus shown in FIG. 1. These factors are: feed instruction for the pinch rollers 3; value detected by the pressure sensor 36 of the stopper device 31; the current value of the motor for driving the pinch rollers 3; position of the clamper 15; position of the movable blade 9; and the rotation speed of the pinch rollers 3.

As the feeding instruction is issued, the electric current value of the drive motor for the pinch rollers 3 is increased, and the pinch rollers 3 are rotated by a predetermined angle of rotation. After the stop of the rotation of the pinch rollers 3, i.e., after the completion of feed of the material 21, the clamper 15 clamps the material 21 and the movable blade 9 starts to move forwardly so as to commence the cutting.

The stopper device 31 can be optimumly positioned if the arrangement is such that the waveform of the detection signal from the pressure sensor 36 includes two peaks: namely, a first peak before the cutting and a second peak immediately after the start of the cutting. The first peak appearing before the cutting shows that the material 21 which has been fed by the pinch rollers 3 intermittently has been brought into collision with the material receiving member 33, while the second peak appearing immediately after the start of the cutting shows that the material receiving member 33 has been pushed by the material 21 due to a slight bend of the material 21 as a result of the cutting.

The characteristics as shown in FIG. 13 were obtained under the conditions of: (1) forging pitch of 165 SPM; (2) material outside diameter of 19 mm$\phi$; (3) material feed set value of 27.4 mm; and (4) stopper position coinciding with the position of the leading end surface of the material at the moment of completion of the material feed.

An explanation will be made hereinunder as to the method of observing the cutting length of the material 21 during the forging of the same in accordance with the described embodiment.

Namely, for observing the length of cutting of the material 21, the value detected by the pressure sensor 36 of the stopper device is continuously picked up and inputted to the controller and an alarm is activated when the detected value has exceeded a predetermined upper limit value or when the same has come down below a predetermined lower limit value. It is possible to effect such a control on the pinch rollers 3 such that the value detected by the pressure sensor always fall within a predetermined allowable range.

Thus, in this embodiment, the stopper device 31 for receiving and stopping the fed material is provided with a pressure sensor 36 and a mechanism for allowing the adjustment of the position of the material receiving member. The pressure sensor 36 is electrically connected to the controller which controls the operation of the motor 5 for driving the pinch rollers 3. Therefore, even when the feed length, i.e., the cutting length, tends to vary due to, for example, wear down of the pinch rollers 3, this tendency is eliminated such as to improve the quality and the production efficiency.

In the material feeding apparatus of the invention, the coiled material is uncoiled, straightened, heated and then cut before fed to the forging machine. When the preceding material from a coil has been consumed, it is necessary to feed the material from a next coil. In such a case, there is a risk that the blanks of lengths smaller than the required cutting length is produced from the trailing end of the leading material and the leading end of the subsequent material. In the following embodiment of the invention, therefore, these blanks of smaller lengths are disposed with as scraps, insteadly of being fed to the forging machine.

Referring back to FIG. 1, the material is fed by the pinch rollers 3 and forwarded to the right side as viewed in this Figure through the heating device 2. The length $l_c$ of the material per stroke in the cold state while the material is on the left or inlet side of the heating device 2 becomes a length $l_f$ in the hot state, i.e., when the material is on the right side of the heating device 2.

Figure 14:
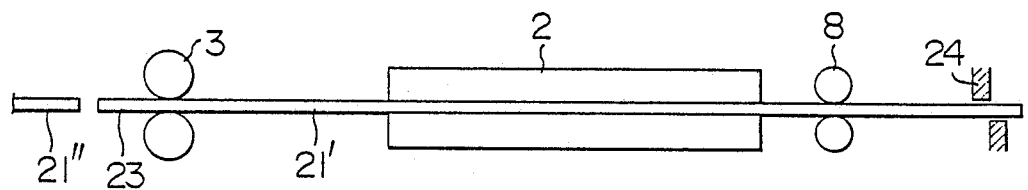
FIG. 14 is an illustration of the forging line shown in FIG. 1, showing the state in which a feed roll takes part in the feed of the material before a leading material passes through the pinch rollers.
Figure 15:
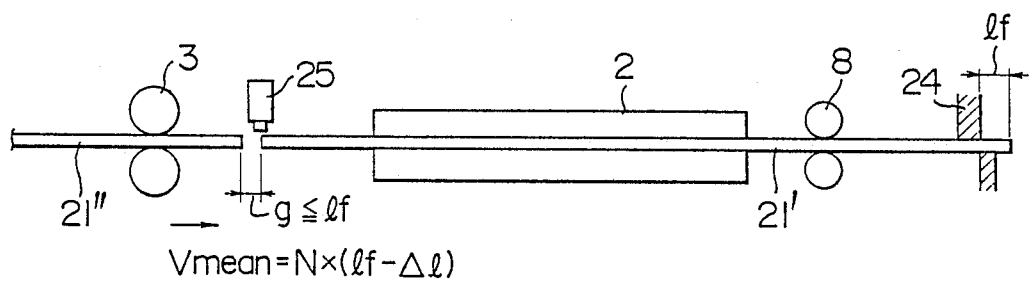
FIG. 15 is an illustration of the forging line shown in FIG. 1, showing the state in which the trailing end of the leading material has passed the pinch rollers and fed solely by the feed roll.

Referring now to FIG. 14, before the tail end 23 of the preceding piece of material 21' of the material 21 to be processed passes the pinch rollers 3, the feed rollers are made to take part in the feeding of the material 21'. When the tail end 23 of the preceding material 21' has left the pinch rollers 3 as shown in FIG. 15, the preceding piece of material 21' is fed solely by the feed rollers 8, while the pinch rollers 3 commences the feed of the next piece of material 21''.

The amount $\Delta l$ of thermal expansion in the heating device 2 per stroke, i.e. per cutting length, is given by $l = l_f - l_c$. That is, the material advances by a distance $l_f$ at the outlet side of the heating device 2 where the feed rollers 8 and the cutting device 24 are disposed, but advances only a distance $l_c$ at the upstream side of the heating device 2, per stroke of the feeding operation. Therefore, the gap g or distance between successive pieces of material can be maintained constant by setting the feed of the pinch roll 3 at a mean speed which is given by $N \, l_c = N \times (l_f - l_c)$, where N represents the number of strokes per minute.

An explanation will be made hereinunder with reference to FIGS. 16a to 16e as to the method of processing the material when the boundary between the preceding piece 21' of the material and the subsequent piece 21'' of the material has approached the feed roll 8. By way of example, it is assumed here that the gap g between the preceding piece 21' and subsequent piece 21'' of the material equals to $0.6 \times l_f$. The position of the trailing end of the preceding piece 21' of material is detected at a suitable position by a photoelectric sensor 25, and the position of the trailing end of the preceding piece 21' of material at the downstream from the photoelectric sensor 25 is stored in a memory and traced up with a compensation for the change in the length due to thermal expansion. After the length between the traced trailing end of the preceding piece 21' of the material and the center, i.e., the pinch line, of the feed rollers 8 has come down within a predetermined length corresponding to No times of cutting length, the blanks which are cut in the (No+N$_1$) strokes are not fed to the forging machine but are disposed of as scraps. In the illustrated embodiment, the stroke number No is selected to be 2 (No=2), while No+N$_1$ is not smaller than 4 (No+N$_1$)≧4.

Namely, in the case of FIGS. 16a to 16d, both the stroke numbers No and $N_1$ are 2 ($N_o=2$, $N_1=2$), so that the blanks cut in the four cutting strokes are disposed of.

Figure 16A:
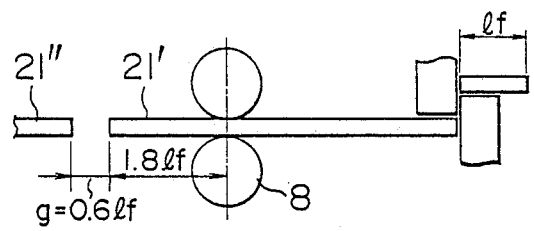
FIGS. 16a to 16e are illustrations of different steps of a process which is conducted when the juncture between the leading material and the trailing material has approached the feed roll.
Figure 16B:
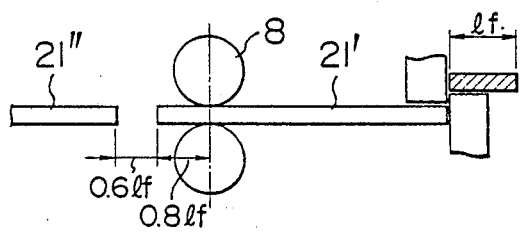
Figure 16C:
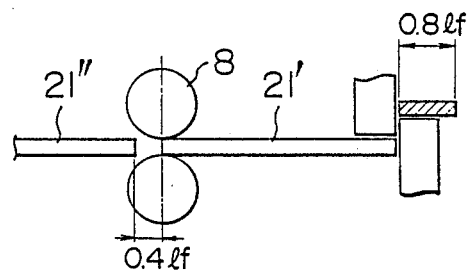

In the arrangement shown in FIG. 16a, it is assumed that the gap g between two successive pieces 21' and 21" of material is given as $g=0.6 \times l_f$, representing the cutting length per stroke by $l_f$. In this state, the trailing end 23 of the preceding piece 21' of material is in the position of $1.8 l_f (<2 l_f)$ as measured from the center of the feed rollers 8. After this state is attained, the first cutting stroke is conducted as shown in FIG. 16b so as to cut a material of the length $l_f$. This cut material is disposed of as a scrap. In this state, the preceding piece 21' of the material remains on the left side of the feed rollers 8 by a length of $0.8 l_f$. Then, as the next feed is commenced, the preceding piece 21' of the material can be fed only by a distance of $0.8 l_f$. In consequence, the material is cut at a length of $0.8 l_f$ in the second stroke. Meanwhile, the subsequent piece 21" of material is fully fed by the pinch rollers 3 by a distance corresponding to the length of one feed stroke, the distance between the preceding and subsequent pieces 21' and 21" of the material is reduced to $0.4 l_f$, i.e., by the amount equal to the difference $0.6 l_f - 0.2 l_f$.

Figure 16D:
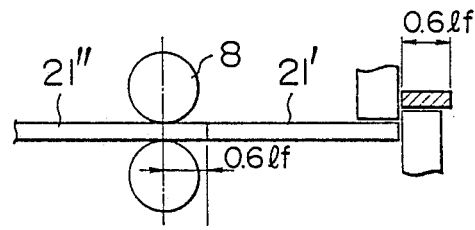
Figure 16E:
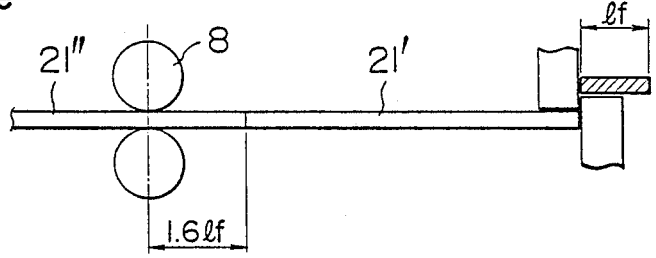

As the subsequent piece 21' of material is fed by the next stroking of the pinch rollers 3, the preceding piece 21' of material, which has been freed, is fed by an amount equal to $0.6 l_f$, i.e., by the amount equal to the difference $l_f - 0.4 l_f$. Consequently, the preceding piece 21' of the material is cut in a length equal to $0.6 l_f$ in the third stroke. On the other hand, the subsequent piece 21' of the material reaches the feed rollers 8 when it has been fed by the length of $0.4 l_f$ and, thereafter, forces out the preceding piece 21' of the material from the feed rollers 8 as shown in FIG. 16d.

Then, as the subsequent piece 21" of the material is fed by the distance equal to the feed length $l_f$ corresponding to one feed stroke, the preceding piece 21' of the material also is fed by the same distance equal to the feed length $l_f$, so that the material is cut in the fourth stroke in the length $l_f$. The cut material, however, is wasted as a scrap.

Thus, the blanks severed by the cutting in the first to fourth strokes are scrapped, thereby avoiding any risk of forging of inferior blanks. From a theoretical point of view, it is considered that the wasting of the blanks cut in the second and third strokes is enough for avoiding the forging of inferior blanks. It is, however, preferred to waste all the blanks cut in the first to fourth strokes, in order to make sure that no inferior blank is supplied to the forging machine.

FIG. 17 shows the processing of the material in the state after the trailing end has come into the region of Mo times of cutting length from the cutting plane, where Mo represents a double of the cutting length. In this case, after the above-mentioned state has been established, the blanks cut in the first to (Mo - $M_1$) the strokes are scrapped. In this case, the value $M_o+M_1$ is not smaller than 3 ($M_o+M_1 \geq 3$). An explanation will be made hereinunder with reference to FIG. 17 as to the case where $M_o=2$, $M_1=1$ and $M_o+M_1=3$.

Figure 17A:
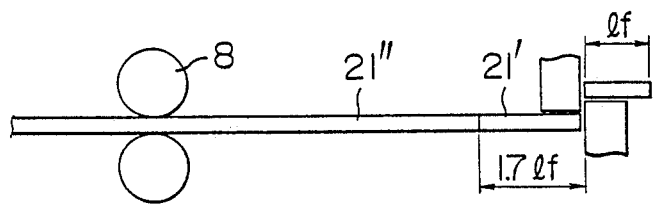
FIGS. 17a to 17d are illustrations of a process for treating the trailing end of the leading material when this trailing end has approached the cutting plane.
Figure 17B:
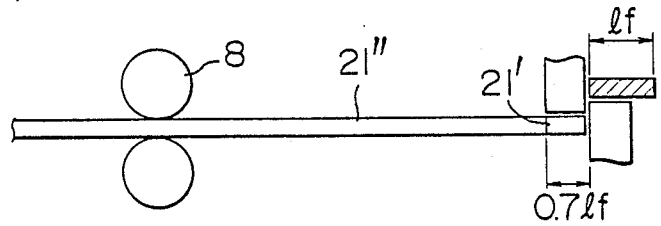

FIG. 17a shows that a blank of the length $l_f$ corresponding to one feed stroke has been cut when the trailing end of the preceding piece 21' of material has reached a position of $1.7 l_f (>2 l_f)$. In the state shown in FIG. 17b, the subsequent piece 21" has been fed by the feed rollers 8 by the distance equal to the one feed length $l_f$, so that the preceding piece 21' has been fed by the same length $l_f$ and cut. The blank thus severed from the preceding piece 21' of the material, however, is disposed of as a scrap.

Figure 17C:
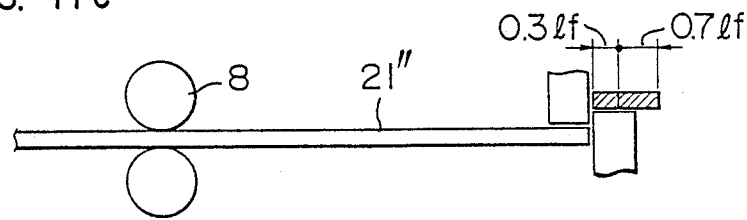

In the state shown in FIG. 17c, the preceding piece 21' of the material has been forced by the subsequent material 21" so that the preceding piece 21' and the subsequent piece 21" are cut by lengths of $0.7 l_f$ and $0.3 l_f$, respectively, i.e., a total length of $l_f$ is severed. The severed pieces, however, are wasted as scraps.

Figure 17D:
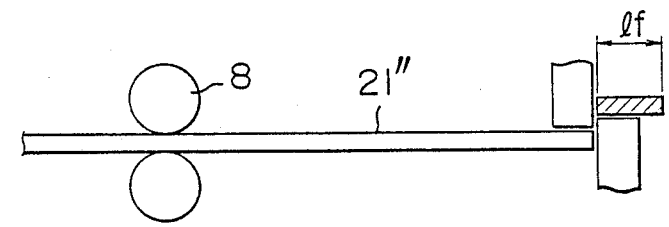

In the state shown in FIG. 17d, there is no preceding piece 21' of material any more, and the subsequent piece 21" of material is cut in the length corresponding to feed length of one feed stroke. The thus severed blank, however, is disposed of as a scrap.

Thus, the blanks cut in the first to third strokes are disposed of as scraps also at the trailing end, so as to prevent forging of inferior blanks and to avoid inclusion of such inferior blanks.

In this embodiment, the feed of the material is conducted by cooperation between the pinch rollers and the feed rollers. The trailing end of the preceding piece of material is detected at a suitable position and the position of the trailing end downstream from the position of the detector is stored in a memory and traced with a suitable compensation for a change in the length due to thermal expansion. After the traced position of the tail end has come into the region of a distance corresponding to the No times of cutting length from the center of the feed rollers, the blanks cut in the subsequent $N_o+N_1$ strokes are not fed to the forging machine but are disposed of as scraps. In addition, once the trailing end of the preceding piece of material has come into the region corresponding to the Mo times of cutting length from the cutting plane, the blanks cut in the subsequent $M_o+M_1$ strokes are scrapped without being fed to the forging machine. It is, therefore, possible to successively feed the uncoiled and straightened pieces of materials without any risk of forging of inferior blanks which are cut from the boundary portions of successive pieces of material and may otherwise be fed to the forging machine.

What is claimed is:

1. A method of forging including driving pinch rollers by driving device for uncoiling a coiled material, straightening the uncoiled material, and intermittently feeding the straightened material through a heating device and subsequently through feed rollers until the forward end of the material is brought in engagement with a stopper, heating the material while it passes through said heating device, cutting the material by a cutting device and then feeding the cut material into a hot forging machine wherein said feeding of said material to said hot forging machine comprises: preparing said driving device which drives said pinch rollers mechanically independently from said hot forging machine; picking up the timing of forging conducted by said hot forging machine as an electric signal; and controlling said driving device in accordance with said electric signal; said driving device driving said pinch rollers at a speed corresponding both to the operation speed of said hot forging machine and the length in which said material is to be cut; and after the cutting by said cutting device, said driving device is being controlled in such a manner that said pinch rollers are driven backwardly relative to a forward direction of said material so as to feed backward the subsequent material at least by an amount equal to the amount of thermal expansion caused by the heating by said heating device and, in the next feeding stroke, said material is fed forwardly by a distance equal to the sum of the predetermined cutting length and the difference between said amount of the backward feed and said amount of thermal expansion.

2. A method according to claim 1, wherein said forging line further has feed rollers disposed between said heating device and said cutting device so that, before the trailing end of the preceding piece of material passes said pinch rollers, said feed rollers are made to take part in the feeding of said preceding piece of material and, after said trailing end has left said pinch rollers, said preceding piece of material is fed solely by said feed rollers, while said pinch rollers feed the subsequent piece of material, said method further comprising: before said trailing end of said preceding piece of material comes into the region of at least one cutting length from the center or the pinch line of said feed rollers, setting the gap between said trailing end of said preceding piece of material and the leading end of said subsequent piece of material to a value within one cutting length; feeding said subsequent piece of material by said pinch rollers at a mean speed of $N \times (l_f - \Delta l)$, where N represents the number of feed strokes per minute, $l_f$ represents the length of said material corresponding to one cutting length after thermal expansion and $\Delta l$ represents the amount of thermal expansion per one cutting length; detecting said trailing end of said preceding piece of material at a suitable place and storing in a memory and tracing the position of said trailing end downstream from the position of detection; after the traced position of said trailing end of said preceding piece of material has come into the region of a distance of No (=2) cutting lengths from the center of said feed rollers, disposing of the blanks cut in subsequent $(N_o + N_1)$ strokes, where condition of $N_o + N_1 \geq 4$ is met; and, after said trailing end of said preceding piece of material has come into the region of a distance of Mo (=2) cutting lengths from the cutting plane, disposing of the blanks cut in the subsequent $M_o + M_1$ strokes, where the condition of $M_o + M_1 \geq 3$ is met, said blanks disposed of being scrapped without being fed to said hot forging machine.

* * * * *